United States Patent Office 3,325,445
Patented June 13, 1967

3,325,445
POLY-ALPHA-OLEFIN COMPOSITIONS CONTAINING PYRAZOLONE STABILIZERS
Raymond Clement Harris and Gordon Clay Newland, Kingsport, Tenn., assignors to Eastman Kodak Company, Rochester, N.Y., a corporation of New Jersey
No Drawing. Filed Aug. 26, 1966, Ser. No. 575,264
8 Claims. (Cl. 260—45.8)

This is a continuation-in-part of S.N. 286,933, filed June 11, 1963, now abandoned.

This invention relates to novel poly-α-olefin compositions and more particularly to poly-α-olefin compositions stabilized to natural and artificial weathering.

Homo and copolymers of olefins such as ethylene and propylene, upon weathering under natural and artificial conditions of light, heat and humidity undergo deterioration. Oxidative deterioration due to exposure to natural or artificial light is particularly noticeable and results in sheets, rods, or filaments of the poly-α-olefins becoming brittle within a comparatively short period of time. Various compounds have been incorporated into poly-α-olefin compositions to improve the stability thereof. As illustrated in the examples hereinafter, some of these compounds stabilize the compositions to some extent to outdoor weathering but are not as efficient for stabilizing to artificial weathering, and may actually cause the poly-α-olefin composition to assume undesirable colorations such as yellowing.

We have discovered certain pyrazolone derivatives which are very efficient stabilizers for poly-α-olefin compositions, particularly for homo and copolymeric compositions of ethylene and propylene. These pyrazolone derivative stabilizers have the following general formula:

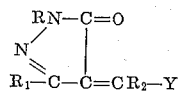

wherein each of R and $R_1$ is either hydrogen, alkyl, aryl or alkaryl, $R_2$ is hydrogen or alkyl, and Y is a 5-hydroxy-4-pyrazolin radical which may be substituted in the 1- and/or 3-nuclear positions. The substitutions may be of any nonreactive radicals including the aryls, e.g., phenyl and substituted phenyl such as nitrophenyl, the monocyclic alkaryls, e.g., tolyl, the alkyls, e.g., lower alkyls, amino carboxy, fluoroalkyl carboalkoxy, hydroxyalkyl, arylsulfonyl, etc., as indicated in the examples below.

A group of the pyrazolone derivatives particularly efficacious as stabilizing agents for the poly-α-olefins, particularly for homo and copolymers of ethylene and propylene, have the following general formula:

II
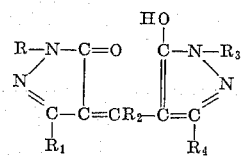

wherein R, $R_1$, $R_3$ and $R_4$ are the same or different members of the group consisting of hydrogen, alkyl, aryl, alkaryl, hydroxyalkyl, arylsulfonyl and nitrophenyl. In addition, $R_1$ and $R_4$ can each be any of amino, fluoroalkyl, carboxy, or carbalkoxy. The larger alkyl groups of up to about 20 carbon atoms such as lauryl, octadecyl and eicosanyl compatibilize the stabilizer with the polyolefin and are thus often preferred, however, mainly preferred are the lower alkyl groups of 1–4 carbon atoms. The aryl groups are monocyclic aryl groups of the benzene series. Both symmetrical and unsymmetrical compounds are effective as stabilizers for the poly-α-olefin compositions.

The symmetrical compounds of the Formulas I and II above are prepared as illustrated in the following preparation of Compound A:

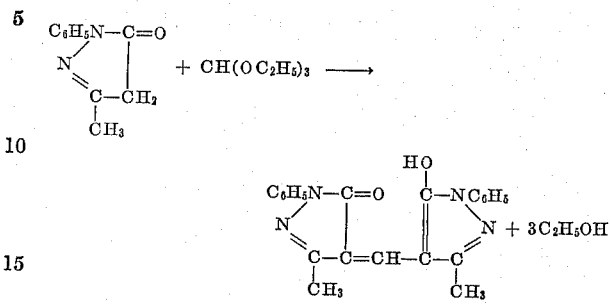

A mixture of 87 g. (0.05 mole) 3-methyl-1-phenyl-5-pyrazolone, 4.4 g. (0.03 mole) triethyl orthoformate and 2 drops piperidine in 25 ml. methyl Cellosolve was stirred and refluxed for 3 hrs. The mixture was chilled and filtered. The filter cake was washed with methanol and then dried at 65° C. Yield: 7.56 g. (84.5%) of material of melting point 182° C.

The unsymmetrical compounds of Formulas I and II above are prepared as illustrated in the following preparation of Compound B:

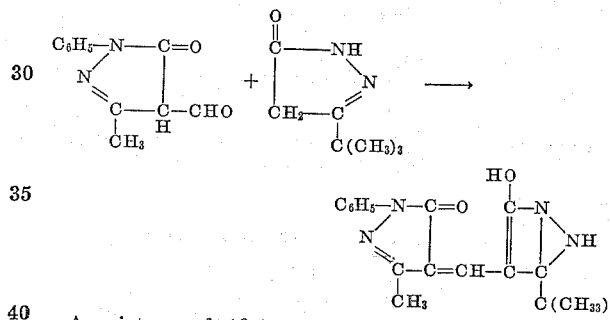

A mixture of 10.1 g. 4-formyl-3-methyl-1-phenyl-5-pyrazolone and 7 g. 3-tertiary-butyl-5-pyrazolone in 50 ml. methyl Cellosolve was heated in a steam bath for 1 hr., chilled for 2 hrs., then filtered and washed with methanol and dried at 65° C. The yield was 12 g.

As will be apparent, the other Compounds $B_1$–O below having Formula II are prepared in a similar manner by heating the appropriate 5-pyrazolones indicated below.

The pyrazolone derivatives are effective stabilizers for the poly-α-olefin compositions when used alone or in combination with each other, in fact, as shown in the examples below, mixtures of the compounds can produce a synergistic stabilizing effect greater than would be expected from the stabilizing effect of each compound alone.

Representative pyrazolone derivative stabilizers having the above general formulas are as follows:

A
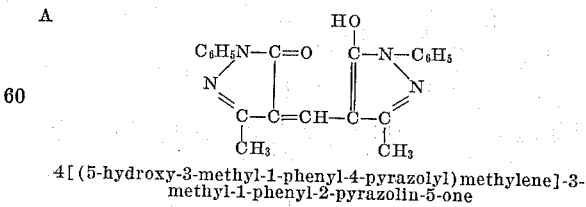

4[(5-hydroxy-3-methyl-1-phenyl-4-pyrazolyl)methylene]-3-methyl-1-phenyl-2-pyrazolin-5-one B
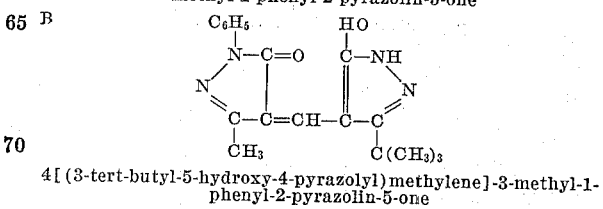

4[(3-tert-butyl-5-hydroxy-4-pyrazolyl)methylene]-3-methyl-1-phenyl-2-pyrazolin-5-one B₁ 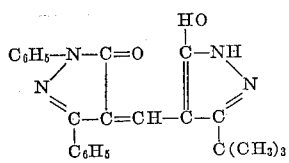

4[(3tert-butyl-5-hydroxy-4-pyrazolyl)methylene]-1,3-diphenyl-2-pyrazolin-5-one

C 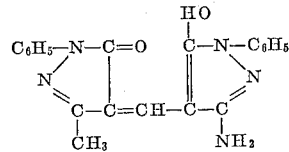

4[(3-amino-5-hydroxy-1-phenyl-4-pyrazolyl)methylene]-3-methyl-1-phenyl-2-pyrazolin-5one D 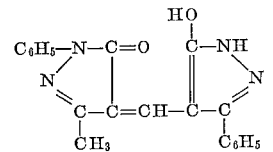

4[(5-hydroxy-3-phenyl-4-pyrazolyl)methylene]-3-methyl-1-phenyl-2-pyrazolin-5-one E 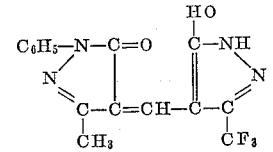

4[(3-trifluoromethyl-5-hydroxy-4-pyrazolyl)methylene]-3-methyl-1-phenyl-2-pyrazolin-5-one F 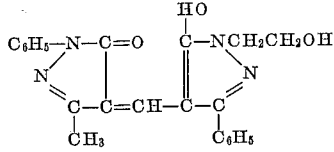

4{[5-hydroxy-1-(2-hydroxy-ethyl)3-phenyl-4-pyrazolyl]methylene}-3-methyl-1-phenyl-2-pyrazolin-5-one G 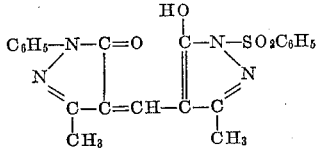

4{[5-hydroxy-3-methyl-1-(phenylsulfonyl)-4-pyrazolyl]methylene}-3-methyl-1-phenyl-2-pyrazolin-5-one H 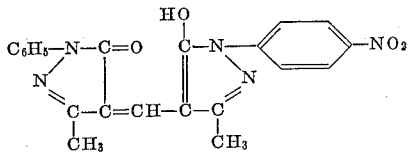

4[(5-hydroxy-3-methyl-1-p-nitro-phenyl-4-pyrazolyl)methylene]-3-methyl-1-phenyl-2-pyrazolin-5-one I 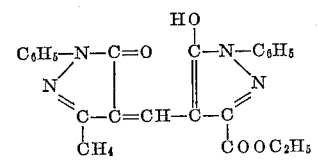

4[(3-ethoxycarbonyl-5-hydroxy-1-phenyl-2-pyrazolin-4-yl)methylene]-3-methyl-1-phenyl-2-pyrazolin-5-one J 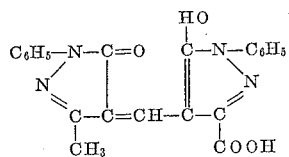

4[(3-carboxy-5-hydroxy-1-phenyl-2-pyrazolin-4-yl)methylene]-3-methyl-1-phenyl-2-pyrazolin-5-one K 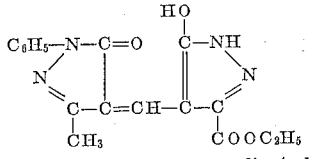

4[(3-ethoxycarbonyl-5-hydroxy-2-pyrazolin-4-yl)methylene]-3-methyl-1-phenyl-2-pyrazolin-5-one L 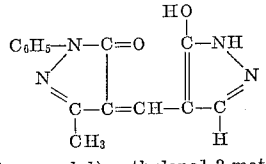

4[(5-hydroxy-4-pyrazolyl)methylene]-3-methyl-1-phenyl-2-pyrazolin-5-one

M 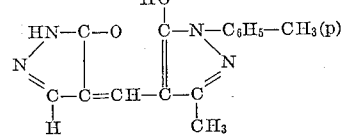

4[(3-methyl-1-p-tolyl-5-hydroxy-4-pyrazolyl)methylene]-2-pyrazolin-5-one

N 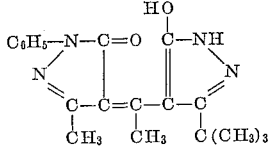

4[(3-tert-butyl-5-hydroxy-4-pyrazolyl)methylene]-3-methyl-1-phenyl-2-pyrazolin-5-one O 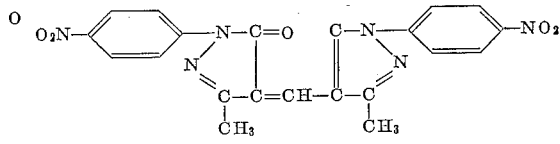

4[(3-methyl-1-p-nitrophenyl-5-hydroxy-4-pyrazolyl)methylene]-3-methyl-1-p-nitrophenyl-2-pyrazolin-5-one The pyrazolone derivative stabilizers according to the present invention can be used in combination or admixture with known poly-α-olefin additives.

The polymers and blends thereof which may be stabilized according to the present invention include the poly-α-olefins of from about 2 to 10 carbons and the various random and block copolymers thereof including the highly stereoregular types which exhibit crystallinity by X-ray and infra-red analysis of the homopolymers of the segments thereof.

Such crystalline block copolymers are those, for example, prepared from propylene and ethylene by block formation techniques employing such catalysts as lithium aluminum hydride, $TiCl_3$ and $BF_3$ in the high temperature solution process, or ethyl aluminum sesquichloride, hexamethyl phosphoramide and $TiCl_3$ in the low temperature slurry process.

The following examples illustrate the formation of such crystalline copolymers.

(A) Propylene-ethylene crystalline copolymer may be prepared by polymerization in a continuous 2-stage reactor system. In the first stirred tubular reactor the feed is liquid propylene and the catalyst is ethyl aluminum sesquichloride, hexamethyl phosphoramide and titanium trichloride in a 2/1/3 molar ratio. The catalyst, suspended in xylene, is fed to the liquid propylene and the polymerization is carried out at about 89° C. and about 770 p.s.i.g. using about 100 p.p.m. $H_2$ to control inherent viscosity. Conversion in the first stage averages 25–30 percent at a catalyst concentration of about 0.2 percent.

The polymer slurry from the first stage is fed to the second stage tubular reactor, 4 weight percent ethylene is added, and the polymerization continued at 80° C. and 860 p.s.i.g.

From the second stage the polymer slurry in liquid propylene is let down to a solids-gas separator. The olefins are flashed off and the polymer dropped to a wash tank. Catalyst removal is effected with hot isobutanol washing.

The propylene-ethylene copolymer containing 97 percent, by weight, of polymerized propylene and 3 percent, by weight, of polymerized ethylene in a yield per unit of catalyst of 250 is obtained. The inherent viscosity of the propylene-ethylene polyallomer is 2.2, the brittleness temperature is −28° C. and the infrared spectrum shows absorption maxima at 9.6 and 13.9 microns.

(B) 0.60 gram of $LiAlH_4$ (.0158 mole) and 2.46 grams of $TiCl_3$ (.0158 mole) slurried in 900 ml. of mineral spirits is charged to a 2-liter stirred autoclave. The polymerization is carried out as follows:

| Time | Pressure | Temp, ° C. |
|---|---|---|
| 3:50 | 800 p.s.i.g. $C_3H_6$ | 133 |
| 4:05 | 1,775 | 161 |
| 4:18 | 1,050 | 164 |
| 4:25 | 900 | 159 |
| 4:50 | 600 | |
| 4:52 | Pressured to 850 p.s.i.g.: With $C_2H_4$ | |
| 5:30 | 515 | 155 |
| 7:00 | 185 | 154 |
|  |  | 151 |

The autoclave is cooled and the polymer washed free of catalyst with hot isobutanol to yield 320 grams of gross polymer containing 85 percent copolymer containing 95 percent by weight of polymerized propylene and 5 percent by weight of polymerized ethylene. The gross polymer exhibits a melt index of 3.6, and inherent viscosity at 145° C. in tetralin of 1.36, a Vicat softening point of 131° C. and a brittleness temperature of −50° C.

Upon extraction with boiling hexane 15 percent of the gross polymer is removed and the crystalline copolymer is obtained. This copolymer has an inherent viscosity at 145° C. in tetralin of 1.55, a Vicat softening point of 139° C., a brittleness temperature of −38° C. and a characteristic infrared absorption maxima at 9.6 and 13.9 microns.

(C) 0.75 gram of $LiAlH_4$ (.02 mole) and 3.06 grams of $TiCl_3$ (.02 mole) in 900 ml. of mineral spirits is charged to a 2-liter stirred autoclave. The polymerization is carried out as follows:

| Time | Pressure | Temp, ° C. |
|---|---|---|
| 2:45 | 800 p.s.i.g. $C_3H_6$ | 132 |
| 2:55 | 1,700 | 150 |
| 3:35 | 550 | |
|  | Pressured to 800 p.s.i.g. with— Butene-1 | |
| 3:45 | 500 | 167 |
| 4:10 | 410 | 170 |
| 4:30 | 375 | 165 |
|  |  | 160 |

The autoclave is discharged through a filter yielding 400 grams of gross polymer containing a propylene-butene-1-copolymer containing 96 percent, by weight, polymerized propylene and 4 percent, by weight, of polymerized butene-1. The gross polymer has a brittleness temperature of −35° C. Extraction with refluxing hexane for 10 hours removes 10 percent of the gross polymer leaving the crystalline propylene-butene-1 copolymer which exhibits a brittleness temperature of −21° C. and an infrared absorption maxima at 9.6 and 13.1 microns.

Further, in regard to such crystalline copolymers, the preferred ones comprise chains which consist essentially of polymerized propylene segments chemically joined to segments of polymerized α-monoolefinic hydrocarbon other than propylene, wherein the copolymer has an inherent viscosity in tetralin at 145° C. of from about 0.4 to 2.4, a density of at least about 0.85, a brittle point below 0° C. and containing at least 80% by weight of polymerized propylene, and preferably at least about 93% by weight of polymerized propylene. It is also noted that the hexane extractable portions of the gross polymer of the above processes are also useful in practicing the present invention.

It will become obvious from applicants' data presented herein that the degradation of poly-α-olefins which is ever present with such polymers is that which the present invention substantially prevents. Whether the degradation be of polyethylene, polypropylene, random or crystalline copolymers thereof, or of higher polyolefins, the attack upon the polymer by ultraviolet radiation, oxygen, humidity and other degradation forces is quite similar and is, as aforesaid, the problem solved by the present invention.

The stabilizers are preferably used in polyethylene, polypropylene and block copolymers thereof, although such polyolefins as poly(3-methylbutene-1), poly(4-methylpentene-1), poly(pentene-1), poly(3,3-dimethylbutene-1), poly(4,4-dimethylbutene-1), poly(octene-1), poly(decene-1), as well as polystyrene and the like can also be stabilized with the subject stabilizers. Both the so-called "low density" and "high density" or high crystallinity poly-α-olefin compositions can be stabilized in accordance with the invention. High density poly-α-olefins generally have a crystallinity of at least 85% and more usually at least 90% as determined by X-ray diffraction. Reference is made to Fawcett et al. U.S. Patent 2,153,553 granted Apr. 11, 1939, with regard to the preparation of various poly-α-olefin compositions that can be stabilized against degradation in accordance with the invention. The additive stabilizers of the invention are especially useful for stabilizing the solid resinous poly-α-olefins having average molecular weights of at least 15,000 and more usually at least 20,000, although the stabilizer combinations of the invention can also be utilized to stabilize the so-called poly-α-olefin waxes having lower average molecular weights of usually 3,000 to 12,000.

The amount of the pyrazolone derivative stabilizer employed in poly-α-olefin compositions in accordance with the invention can be widely varied, the stabilizing amount usually varying with the particular use to which the poly-α-olefin compositions are to be put. Concentrations of at least about 0.01% of stabilizer are suitable, although about 0.01% to 10% of stabilizer are generally used, with about 0.1% to 3% being preferred, the concentration being based on the weight of the poly-α-olefin.

The stabilizers of the invention can be incorporated or blended into poly-α-olefin compositions by the conventional methods utilized for blending such materials into resins or plastics. Typical of such methods that can be suitably employed include milling on heated rolls, deposition from solvents, and dry blending.

The stabilizers of the present invention lend to poly-α-olefin compositions improved stability, and more particularly, improved stability against oxidative deterioration resulting from weathering out of doors. In addition, poly-α-olefin compositions containing the stabilizers of the invention have enhanced stability particularly against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments and other shaped articles, including the widely used films of the polymers about .5 to 100 mils in thickness. The present compositions can be used for coating paper, wire, metal foil glass fiber fabrics, synthetic and natural textiles or fabrics, and other such materials.

The invention is illustrated by the following examples of preferred embodiments thereof.

Example 1

Conventional low-density polyethylene of melt index of 2 was mixed with the additives to be evaluated on hot compounding rolls for 4 minutes, the front roll being held at 270° F. and the rear roll at 220° F. Flat plates, 50 and 125 mils, were compression molded from the rolled mix. Samples were cut from the 50-mil plate and exposed outdoors. The progress of the photo-oxidation was followed by carbonyl formation as measured at 5.82µ. The times in months required for the formation of 10 arbitrary units of carbonyl, enough to cause appreciable deterioration in the electrical properties of the plastic compositions, were recorded and are shown in Table 1. Samples were cut from the 125-mil-thick plates and exposed outdoors and in a modified Atlas Twin-Arc Weather-Ometer [Anal. Chem., 25, 460 (1953)] in the form of stressed specimens. The exposure times required to cause stress cracking of the specimens are also recorded in Table 1. Included in Table 1 for comparison are two commercial ultraviolet stabilizers.

TABLE 2.—POLYPROPYLENE STABILIZATION

| Additive | Concn. | Color Change on Exposure to Brittleness Point | Stabilization Efficiency Rating |
|---|---|---|---|
| None (Control) | | None | 1 |
| Compound: | | | |
| A | 5 | ___do___ | 13 |
| B | 5 | ___do___ | 37 |
| B₁ | 5 | ___do___ | 14 |
| C | 5 | ___do___ | 10 |
| D | 5 | Sl. Faded | 14 |
| E | 5 | None | 10 |
| F | 5 | ___do___ | 14 |
| G | 5 | ___do___ | 23 |
| H | 5 | ___do___ | 16 |
| I | 5 | ___do___ | 22 |
| J | 5 | ___do___ | 10 |
| K | 5 | Faded | 8 |
| E } | 5 } | } None | 37 |
| K | 5 | | |

It will be seen from Table 2 that the compounds of the invention vary somewhat in their stabilizing effect but all of the Compounds A–K, except when K was used alone, were more efficient stabilizers than known commercial stabilizers. In particular, the mixture of Compound E with Compound K produced a synergistic efficiency of 37 compared to efficiencies of 10 and 8 respectively for Compounds E and K. The films containing A–K are initially colored and, except for those containing D and K, did not undergo color change on exposure, whereas films contain-

TABLE 1.—POLYETHYLENE STABILIZATION

| Additive | Concn.[1] | Outdoor Exposure Time (Months) Required to Produce 10 Arbitrary Units of Carbonyl | Stress-Cracking Exposure Time | | Color Change on Exposure |
|---|---|---|---|---|---|
| | | | Outdoors, Months | Weather-Ometer, Hours | |
| None (Control) | | 1 | 12 | 330 | Sl. Yellowing. |
| Compound A | 1 | 17 | >24 | 3,000 | None. |
| Compound B | 1 | | >12 | 2,360 | Do. |
| 4-dodecyloxy-2-hydroxybenzophenone | 1 | 18 | >72 | 2,600 | Do. |
| Chrome Yellow M [2] | 5 | | 12 | 636 | Darkens. |

[1] Parts per 100 parts polymer.
[2] Lead chromate pigment.

It will be apparent from Table 1 that Compounds A and B are very effective for the prevention of deterioration in the form of stress-cracking and color change upon exposure to natural and artificial weather conditions, and are more effective than the commercial stabilizers.

Example 2

The additives to be tested were added to a 4% dope of polypropylene in 1,2,3,4-tetrahydronaphthalene and heated for 30 min. with mixing at 145° C. The dope containing the additive was cast on a ferrotype plate heated to 143° C., and the 1,2,3,4-tetrahydronaphthalene evaporated to leave a 3-mil-thick film of polypropylene containing the additive. The film was quenched in cold water and peeled from the ferrotype plate. Test specimens 2.5 by 0.5 in. were cut from these films and exposed in a modified Atlas Twin-Arc Weather-Ometer. The exposure times required to render the specimen brittle were recorded. Brittleness was defined to have developed in the exposed specimens when they broke when creased with the exposed surface on the outside of the crease. The effectiveness of the additive was measured by stabilization efficiency ratings, defined as the ratio of the exposure time for development of brittleness in the stabilized sample to the exposure time for development of brittleness in the unstabilized control. According to this definition of stabilization efficiency rating, values greater than unity signify positive stabilization. The stabilization efficiency ratings of the compounds are recorded in Table 2.

ing certain commercial ultraviolet stabilizers become yellow or brown. On the basis of the tests of Tables 1 and 2, Compounds A, B, G, I and the mixture of Compound E with Compound K were therefore selected as very useful stabilizers for the poly-α-olefin compositions.

Example 3

Polypropylene was mixed with 1% of Compound A in a Banbury mixer. The resultant polypropylene slab was granulated and spun into a monofilament 8 mils in diameter. Specimens of this composition and an unstabilized control were exposed in a modified Atlas Twin-Arc Weather-Ometer. The degradation due to weathering was followed by measurements of elongation and tenacity. The exposure hours required to reduce these properties to 50% of their initial values are listed in Table 3.

TABLE 3.—POLYPROPYLENE STABILIZATION

| Composition | Weather-Ometer Exposure Required to Reduce to 50% Initial, Hr. | |
|---|---|---|
| | Tenacity | Elongation |
| Polypropylene, unstabilized | 150 | 140 |
| Polypropylene plus 1% Compound A | 650 | 525 |

Example 4

A copolymer of 15% butene:85% propylene having a melt flow of 4 was hot-roll-compounded with the additives to be tested. The compounding temperatures were 300° F. and 280° F. for the front, and rear rolls, respectively. Flat plates, 1/32-in. thick, were compression molded at 350° F. and 3000 p.s.i. and specimens 1/2 x 1 1/2 in. were cut for testing for weathering stability. A control composition containing no additive was similarly prepared and tested with the compositions containing additives. The specimens cut from the plates were bent into a U shape and inserted upside down in a metal channel 1/2 x 1/2 in. The channel containing the compositions was exposed in an Atlas Weather-Ometer modified with 10 Westinghouse fluorescent sunlamps [Anall Chem. 25, 460 (1953)]. The specimens so stressed by mounting in the channels were inspected periodically for cracks visible to the unaided eye. The hours of exposure in the Weather-Ometer necessary to cause cracks in the stressed areas of the specimens was defined as the stress-crack life.

The compositions tested and the stress-crack life as determined under these conditions are summarized in Table 4 below. The compounds are identical to those listed in Tables 1 and 2 hereinabove.

TABLE 4.—STABILIZATION OF BUTENE-PROPYLENE COPOLYMERS

| Additive at concn. level of 1%: | Weather-Ometer stress-crack life, hr. |
|---|---|
| None | 120 |
| Compound A | 340 |
| Compound B | 410 |
| Compound C | 940 |
| Compound E | 360 |
| Compound J | 610 |
| Ultraviolet stabilizer OPS [1] | 230 |

[1] p-Tert-octylphenyl salicylate.

As shown in Table 4, all the additives were effective in stabilizing the copolymer against ultraviolet breakdown in the Weather-Ometer. Compound C was especially effective and improved the stress-crack life of the composition by a factor of 7.4. Other representative additives selected from Tables 1 and 2 were also effective in stabilizing the polymer. This example illustrates the effectiveness of the stabilizer for butene-propylene and like copolymers.

Example 5

A copolymer of 20% ethylene:80% propylene, having a melt flow of 2, was compounded on hot rolls with the additives to be tested. Both the front and rear rolls were maintained at a temperature of 320° F. Flat plates 1/16-in. thick were compression molded from the roll slabs and specimens were cut from this plate for testing. A composition containing no additive was also compounded and molded for testing as a control.

Specimens 1/2 x 1 1/2 in. were cut from the plates and mounted in a channel 1/2-in. wide x 1/2-in. deep. The channel containing the specimens was exposed in the modified Weather-Ometer described in Example 6 until cracks were visible in the stressed areas of the specimens. The time in the Weather-Ometer needed to produce cracks in the stressed areas of the specimens was defined as the stress-crack life of the composition. The compositions tested and the results obtained are summarized in Table 5 below.

TABLE 5.—STABILIZATION OF ETHYLENE-PROPYLENE COPOLYMER

| Additive at concn. level of 1%: | Weather-Ometer stress-crack life, hr. |
|---|---|
| None | 110 |
| Compound A | 310 |
| Compound B | 340 |
| Compound C | 860 |
| Compound E | 310 |
| Compound J | 550 |
| Ultraviolet stabilizer OPS [1] | 440 |

[1] p-Tert-octylphenyl salicylate.

The data in the table indicate that the compositions containing the stabilizer are more stable than that composition without stabilizer. In this copolymer, also, Composition C was found to be every effective in stabilizing the composition against degradation in the Weather-Ometer. This example further illustrates the effectiveness of this type of compound as a stabilizer for poly-α-olefin copolymers.

Example 6

Samples were procured of polypropylene of intrinsic viscosity 1.4 made by the polymerization of propylene using an anionic Zeigler type of catalyst such as disclosed by U.S. Patent 2,985,617.

1.0% by weight of the additives shown in the following table were blended with samples of the polypropylene in a C. W. Brabender Plastograph at a temperature and shear sufficiently high to permit blending the molten polymer. Flat plates 5.0 mils thick were compression molded from the plastograph slab. Specimens 2 1/2 x 1/2 inch were cut from the plates and exposed in an Atlas sunshine Arc Weather-Ometer, type XWR, until they became brittle. The specimens were considered to be brittle when they broke on flexing wtih the weathered side on the outside of the bend. Stabilization ratings for the additives were calculated by dividing the number of hours of exposure required to embrittle the stabilized film by the corresponding number of hours of exposure required to embrittle the film containing no additive.

The stabilization values thus obtained are shown in the following table:

| Number | Additive | Stabilization Rating |
|---|---|---|
| 1 | None | 1.0 |
| 2 | 4[(3-methyl-5-hydroxy-1-phenyl-4-pyrazolyl)]-methylene-3-methyl-1-phenyl-2-pyrazolin-5-one. | 2.8 |
| 3 | 4[(3-tert-butyl-5-hydroxy-4-pyrazolyl)] methylene-3-methyl-1-phenyl-2-pyrazolin-5-one. | 3.2 |
| 4 | 1-phenyl-3-methyl-2-pyrazolin-5-one | 0.8 |
| 5 | Santowhite Powder (4,4'-butylidenebis (6-tert-butyl-m-cresol)). | 0.9 |
| 6 | Santowhite Crystals (4,4'-thiobis-(6-tert-butyl-m-cresol)). | 1.1 |
| 7 | Advastab 3 (organo-tin salt, polymeric (hydrolyzed) anhydrobisbutyl polystannanediol dibutyl ester). | 0.8 |
| 8 | Advastab SN (strontium salt of a carboxy acid (strontium naphthenate) in a phosphate ester plasticizer medium). | 0.8 |

The stabilization ratings indicate that the Compound 4 of U.S. 2,458,780 causes polypropylene to undergo a decrease in stability to ultraviolet light and Compounds 5, 6, 7 and 8 of U.S. 2,985,617 cause either decrease or only slight increase in ultraviolet light-stability of polypropylene, whereas Compounds 2 and 3 of the present application Ser. No. 575,264 effect a significant increase in stability to ultraviolet light.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A solid poly-α-olefin composition containing a stabilizing amount of at least one compound having the general formula:

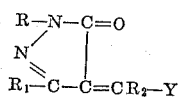

wherein R and R₁ each is a member of the group consisting of hydrogen, alkyl, aryl and alkaryl, R₂ is hydrogen or alkyl, and Y is a substituted or unsubstituted 5-hydroxy-4-pyrazolin radical.

2. A solid poly-α-olefin composition containing a stabilizing amount of at least one compound having the general formula:

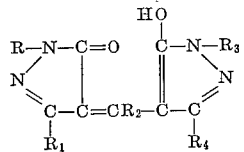

wherein
R and R₃ are the same or different members of the group consisting of hydrogen, alkyl, aryl, alkaryl, hydroxyalkyl, arylsulfonyl and nitrophenyl, and R₁ and R₄ are as R and R₃, and in addition may be the same or different members of the group consisting of fluoroalkyl, carboxy, and carbalkoxy.

3. The composition of claim 1 wherein the poly-α-olefin is a member of the group consisting of polyethylene, polypropylene and random or crystalline copolymers thereof or with other α-olefins.

4. The composition of claim 1 wherein the stabilizing compound is 4[(5-hydroxy-3-methyl-1-phenyl-4-pyrazolyl)methylene]-3-methyl-1-phenyl-2-pyrazolin-5-one.

5. The composition of claim 1 wherein the stabilizing compound is 4[(3-tert-butyl-5-hydroxy-4-pyrazolyl)methylene]-3-methyl-1-phenyl-2-pyrazolin-5-one.

6. The composition of claim 1 wherein the stabilizing compound is 4{[(5-hydroxy-3-methyl-1-phenylsulfonyl)4-pyrazolyl]methylene} - 3-methyl-1-phenyl-2-pyrazolin-5-one.

7. The composition of claim 1 wherein the stabilizing compound is 4[(3-ethoxycarbonyl-5-hydroxy-1-phenyl-2-pyrazolin-4-yl)methylene]-3-methyl - 1 - phenyl-2-pyrazolin-5-one.

8. The composition of claim 1 containing as a stabilizer a mixture of 4[(3-trifluoromethyl-5-hydroxy-4-pyrazolyl)methylene] - 3 - methyl-1-phenyl-2-pyrazolin-5-one and 4[(3-ethoxycarbonyl-5-hydroxy-2-pyrazolin - 4 - yl)methylene]-3-methyl-1-phenyl-2-pyrazolin-5-one.

References Cited

UNITED STATES PATENTS 2,458,780  1/1949  Howland _____ 260—45.8
2,985,617  5/1961  Salyer et al. _____ 260—45.7

OTHER REFERENCES

Wallace et al.: Journal Org. Chem., vol. 26, 3825–6 (1961).

DONALD E. CZAJA, *Primary Examiner.*

LEON J. BERCOVITZ, J. J. WELSH,
*Assistant Examiners.*

UNITED STATES PATENT OFFICE
CERTIFICATE OF CORRECTION

Patent No. 3,325,445                         June 13, 1967

Raymond Clement Harris et al.

It is hereby certified that error appears in the above numbered patent requiring correction and that the said Letters Patent should read as corrected below.

Column 2, lines 34 to 39, for that portion of the formula reading

Signed and sealed this 17th day of December 1968.

(SEAL)
Attest:

Edward M. Fletcher, Jr.                         EDWARD J. BRENNER
Attesting Officer                               Commissioner of Patents